United States Patent
Kim et al.

(10) Patent No.: US 9,038,462 B2
(45) Date of Patent: May 26, 2015

(54) INERTIAL SENSOR CONTROL MODULE AND METHOD FOR CONTROLLING INERTIAL SENSOR CONTROL MODULE

(75) Inventors: Kyung Rin Kim, Gyunggi-do (KR); Byoung Won Hwang, Gyunggi-do (KR); Chang Hyun Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 399 days.

(21) Appl. No.: 13/484,207

(22) Filed: May 30, 2012

(65) Prior Publication Data

US 2013/0247664 A1    Sep. 26, 2013

(30) Foreign Application Priority Data

Mar. 26, 2012    (KR) .................. 10-2012-0030655

(51) Int. Cl.
  *G01C 19/56*    (2012.01)
  *G01C 19/5776*    (2012.01)

(52) U.S. Cl.
  CPC .................. *G01C 19/5776* (2013.01)

(58) Field of Classification Search
  USPC .............. 73/504.12, 514.29, 514.35
  See application file for complete search history.

(56) References Cited

U.S. PATENT DOCUMENTS

| | | | |
|---|---|---|---|
| 7,322,237 B2 * | 1/2008 | Kutsuna | 73/504.12 |
| 7,353,705 B2 * | 4/2008 | Mori et al. | 73/504.12 |
| 2012/0304770 A1 * | 12/2012 | Kim et al. | 73/514.35 |

FOREIGN PATENT DOCUMENTS

| KR | 10-2007-0046920 | 5/2007 |
| KR | 1020110072229 | 6/2011 |

OTHER PUBLICATIONS

Office action dated Jul. 30, 2013 from corresponding Korean Patent Application No. 10-2012-0030655 and its English summary provided by the clients.

* cited by examiner

*Primary Examiner* — John Chapman, Jr.
(74) *Attorney, Agent, or Firm* — Ladas & Parry, LLP

(57) ABSTRACT

Disclosed herein is an inertial sensor control module. The inertial sensor control module according to a preferred embodiment of the present invention includes: an inertial sensor including a driving mass, a driving unit driving the driving mass of the inertial sensor according to a control signal to the inertial sensor, a control unit connected to the driving unit and generating the control signal to transfer the generated control signal to the driving unit, and a sensing unit connected between the inertial sensor and the control unit and detecting information about whether the driving mass of the inertial sensor is in a stabilized state or information about an inertial force of the inertial sensor to transfer the detected information to the outside or the control unit.

17 Claims, 4 Drawing Sheets

INERTIAL SENSOR CONTROL MODULE AND METHOD FOR CONTROLLING INERTIAL SENSOR CONTROL MODULE

CROSS REFERENCE TO RELATED APPLICATION

This application claims the benefit of Korean Patent Application No. 10-2012-0030655, filed on Mar. 26, 2011, entitled "Driving-Control Module and method for Inertial Sensor," which is hereby incorporated by reference in its entirety into this application.

BACKGROUND OF THE INVENTION

1. Technical Field

The present invention relates to an inertial sensor control module and a method for controlling the inertial sensor control module.

2. Description of the Related Art

Recently, an inertial sensor has been used as various applications, for example, military such as an artificial satellite, a missile, an unmanned aircraft, or the like, vehicles such as an air bag, electronic stability control (ESC), a black box for a vehicle, or the like, hand shaking prevention of a camcorder, motion sensing of a mobile phone or a game machine, navigation, or the like.

The inertial sensor is divided into an acceleration sensor that can measure a linear motion and an angular velocity sensor that can measure a rotating motion.

Acceleration may be calculated by Newton's law of motion "F=ma", where "m" represents a mass of a moving body and "a" is acceleration to be measured. Further, angular velocity may be calculated by Coriolis force "F=2 mΩ×v", where "m" represents the mass of the moving body, "Ω" represents the angular velocity to be measured, and "v" represents the motion velocity of the mass. In addition, a direction of the Coriolis force is determined by an axis of velocity v and an rotating axis of angular velocity Ω.

The inertial sensor may be divided into a ceramic sensor and a microelectromechanical systems (MEMS) sensor according to a manufacturing process. Among others, the MEMS sensor is classified into a capacitive type, a piezoresistive type, a piezoelectric type, or the like, according to a sensing principle.

In particular, as the MEMS sensor can be easily manufactured in a small size and a light weight by using an MEMS technology as described in Korean Patent Laid-Open Publication No. 2011-0072229 (laid-open published on Jun. 29, 2011), a function of the inertial sensor has been continuously developed.

For example, the inertial sensor is being continuously developed from a uniaxial sensor capable of detecting only an inertial force for a single axis using a single sensor to a multi-axis sensor capable of detecting an inertia force for a multi-axis of two axes or more using a single sensor.

As described above, in order to implement a six-axis sensor detecting the multi-axis inertial forces, that is, three-axis acceleration and three-axis angular velocities using a single sensor, accurate and effective driving and control are required.

In the prior art, the inertial sensor cannot accurately detect the time when a driving mass is stably driven, such that driving time and sensing time needs to be set in consideration of the case in which an error exceeds a tolerable range.

Further, when the driving mass is designed in various sizes and forms, the driving time and the sensing time of the sensor cannot be set at a time. In particular, as each control time needs to be set in consideration of the case in which an error exceeds a tolerable range, productivity is degraded and the effective driving and control of sensing may not be performed.

SUMMARY OF THE INVENTION

The present invention has been made in an effort to provide an inertial sensor control module capable of controlling driving and sensing by actively detecting a stabilization state of a driving mass.

In addition, the present invention has been made in an effort to provide a method for controlling an inertial sensor control module capable of controlling driving and sensing by actively detecting a stabilization state of a driving mass.

According to a preferred embodiment of the present invention, there is provided an inertial sensor control module including: at least one inertial sensor including a driving mass; a driving unit driving the driving mass of the inertial sensor according to a control signal to the inertial sensor; a control unit connected to the driving unit and generating a control signal to transfer the generated control signal to the driving unit; and a sensing unit connected between the inertial sensor and the control unit and detecting information about whether the driving mass of the inertial sensor is in a stabilized state for generating the control signal to transfer the detected information to the control unit.

The inertial sensor may include an acceleration sensor detecting accelerations in three axis directions or an angular velocity sensor detecting angular velocities in three axis directions.

The control unit may include an automatic gain control (AGC) and the control signal may include a signal for applying a gain for converting a resonance peak value of the driving mass into a set target value to the driving mass by using the AGC.

The sensing unit may receive a sensing request signal of the control unit, and detect amplitude peak values of the driving mass to transfer the detected amplitude peak values to the control unit.

According to another preferred embodiment of the present invention, there is provided a method for controlling an inertial sensor control module including: detecting, by a control unit, an amplitude peak value P of a driving mass driven in an inertial sensor using a sensing unit; comparing, by the control unit, a difference value $\Delta t$ between a target value T and the amplitude peak value P with a threshold value to determine whether the difference value $\Delta t$ has a larger value than the threshold value; performing and processing, by the control unit, an AGC operation for applying a gain to the driving mass of the inertial sensor as the difference value $\Delta t$ has a larger value than the threshold value; determining whether the driving mass is stabilized; and when the driving mass is in a stabilized state, performing and processing, by the control unit, an AGC operation for applying a new gain to the driving mass of the inertial sensor.

The determining whether the driving mass is in the stabilized state further may include: when the driving mass is in an unstabilized state, stopping and waiting, by the control unit, the AGC operation for applying a new gain to the driving mass of the inertial sensor.

The performing and processing of the AGC operation may further include: calculating, by the control unit, a gain corresponding to the difference value $\Delta t$; and applying the gain corresponding to the difference value $\Delta t$ to the driving mass of the inertial sensor through a driving unit.

The performing and processing of the AGC operation may further include: calculating, by the control unit, the overall gain corresponding to the difference value Δt, and the number of steps applying the gain according to the difference value Δt, and each gain applied for each step; and applying each gain for each step to the driving mass of the inertial sensor through the driving unit.

The determining whether the driving mass is stabilized may include: detecting variations $\Delta a_n$ of amplitude peak values of the driving mass after the gain is applied; and comparing a sum of the detected variations $\Delta a_n$ with a threshold value TH to determine whether the sum of the detected variations $\Delta a_n$ is smaller than the threshold value TH.

The determining whether the driving mass is stabilized may include: detecting variations $\Delta a_n$ of amplitude peak values of the driving mass after the gain is applied; and determining a corresponding oscillation period as the stabilized state by detecting at least one oscillation period in which the detected variations $\Delta a_n$ having a value of 0.

The threshold value TH may be set according to a mass, a size, and a material of the driving mass.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
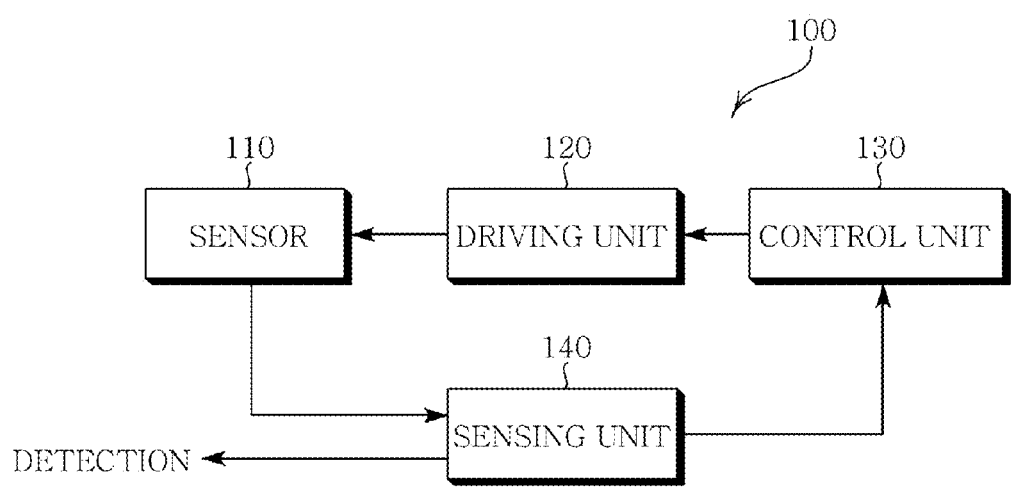
FIG. 1 is a block diagram of an inertial sensor control module according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the prior art would obscure the gist of the present invention, the description thereof will be omitted.

Hereinafter, preferred embodiments of the present invention will be described in detail with reference to the accompanying drawings. FIG. 1 is a block diagram of an inertial sensor control module according to a preferred embodiment of the present invention.

As shown in FIG. 1, an inertial sensor control module 100 according to a preferred embodiment of the present invention includes an inertial sensor 110, a driving unit 120, a control unit 130, and a sensing unit 140.

The inertial sensor 110 may include an acceleration sensor including a driving mass to detect accelerations in three axis directions that are positioned on a space or an angular velocity sensor detecting angular velocities in three axis directions. The inertial sensor 110 generates signals corresponding to motions such as movement, rotation, or the like, and transfers the generated signals to the control unit 130 via the sensing unit 140.

The driving unit 120 is connected between the inertial sensor 110 and the control unit 130 and applies the driving and control signals to the inertial sensor 110 according to a control of the control unit 130, thereby driving the driving mass of the inertial sensor 110.

The control unit 130 includes an automatic gain control (AGC) and may apply the driving signal and the sensing signal, respectively, to the driving unit 120 and the sensing unit 140 according time series and apply a gain to the inertial sensor 110 via the driving unit 120 by detecting a stabilized state of the inertial sensor 110.

In particular, the control unit 130 detects a resonance state of the driving mass to apply the gain for maintaining the resonance state in a state of a set target value, so as to constantly maintain the driving mass resonance of the inertial sensor 110 in the target value.

In this case, the control unit 130 does not correct a difference between a resonance peak value of the driving mass and the target value at a time during a process of applying the gain, but stepwise corrects a difference between the target value and a current peak value by detecting whether the driving mass of the inertial sensor 110 is in the stabilized state so as to stably change the driving mass.

The sensing unit 140 receives a sensing request signal from the control unit 130, and detects information about whether the driving mass of the inertial sensor 110 is in the stabilized state or information about an inertial force of the inertial sensor 110 to transfer the detected information to the outside or the control unit 130.

The inertial sensor control module 100 according to the preferred embodiment of the present invention configured as described above actively detects whether the driving mass of the inertial sensor 110 is in the stabilized state and therefore, applies the gain to the inertial sensor 110 by using the AGC for correcting the current resonance state of the inertial sensor 110 to the state of the set target value.

Therefore, the inertial sensor control module 100 according to the preferred embodiment of the present invention corrects the mass resonance of the inertial sensor 110 to the state of the target value by using an algorithm determining standby time and applied time applying the gain to the inertial sensor 110 and may constantly maintain the mass resonance.

Figure 2:
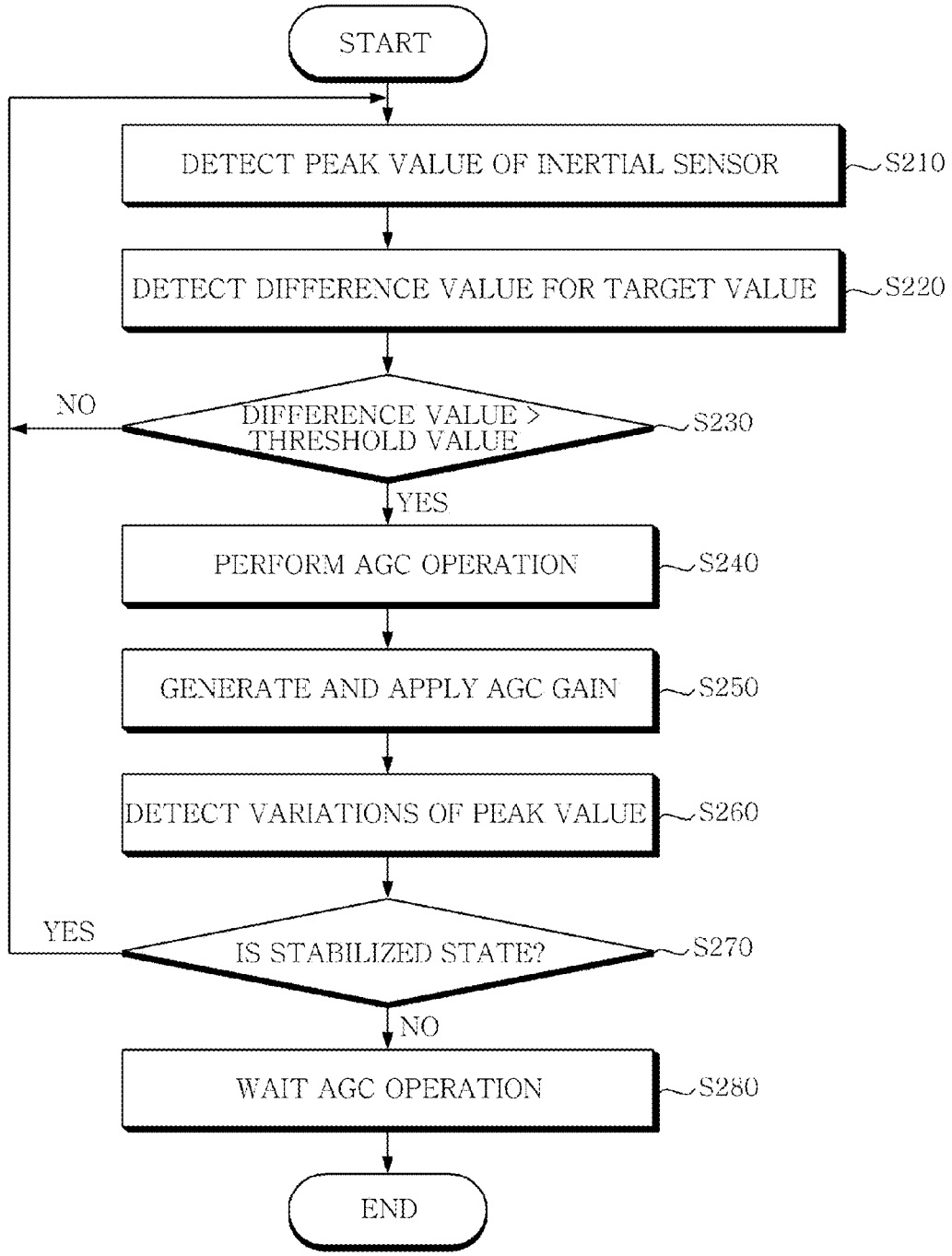
FIG. 2 is a flow chart for describing a method for controlling an inertial sensor according to another preferred embodiment of the present invention.

Hereinafter, the method for controlling an inertial sensor according to the preferred embodiment of the present invention will be described with FIGS. 2 to 4. FIG. 2 is a flow chart for describing a method for controlling an inertial sensor according to another preferred embodiment of the present invention, FIGS. 3A and 3B are exemplified diagrams for describing a method for controlling an inertial sensor according to another preferred embodiment of the present invention, and FIG. 4 is an exemplified diagram for describing a process of detecting a stabilization state according to the method for controlling an inertial sensor according to another preferred embodiment of the present invention.

According to the method for controlling an inertial sensor according to another preferred embodiment of the present invention, the control unit 130 first detects amplitude peak values of the driving mass driven in the inertial sensor 110 by the sensing unit 140 (S210).

Figure 3A:
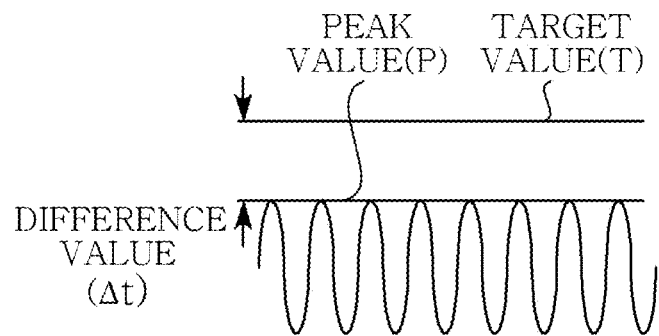
FIGS. 3A and 3B are exemplified diagrams for describing a method for controlling an inertial sensor according to another preferred embodiment of the present invention.
Figure 3B:
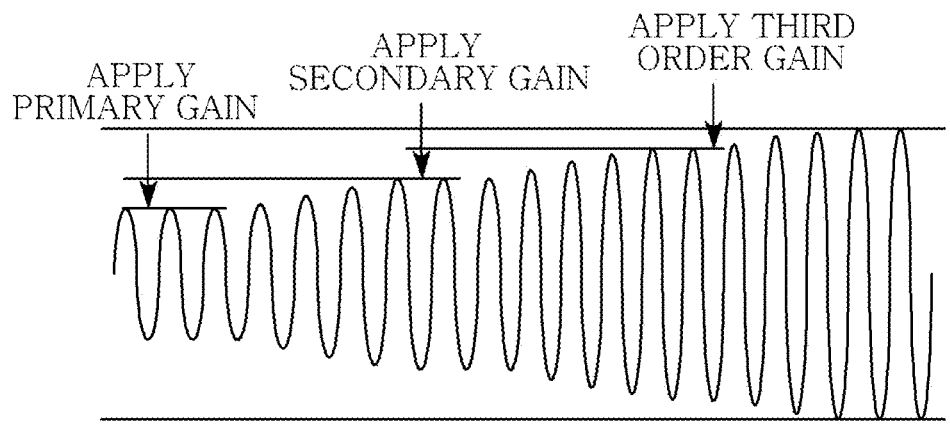
Figure 4:
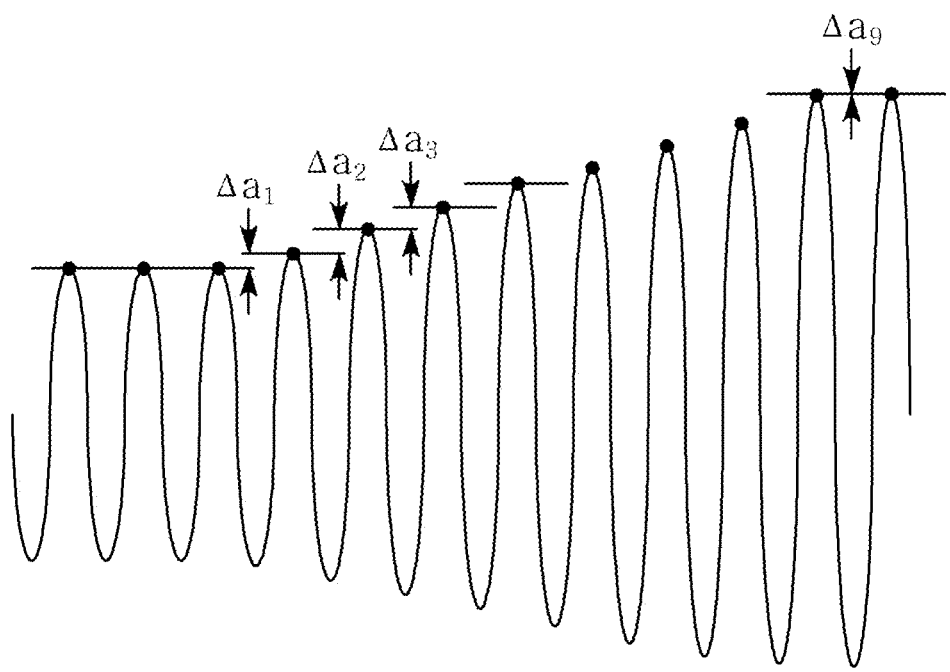
FIG. 4 is an exemplified diagram for describing a process of detecting a stabilization state according to the method for controlling an inertial sensor according to another preferred embodiment of the present invention.

For example, as shown in FIG. 3A, for the driving mass of the inertial sensor 110 that is resonated by a target value T, the control unit 130 may detect an amplitude peak value P of the operating driving mass by the sensing unit 140.

For the amplitude peak value P of the detected driving mass, the control unit 130 detects a difference value Δt of the peak value P with respect to the target value T (S220).

Thereafter, the control unit 130 determines whether the difference value Δt is a larger value than a threshold value (S230).

Here, the threshold value is a threshold value determining whether the gain of the AGC is applied to the driving mass of the inertial sensor 110 so as to resonate the driving mass of the inertial sensor 110 as the target value T. The threshold value is set according to the mass, size, and material, or the like, of the driving mass configuring the inertial sensor 110.

In this case, when the difference value Δt has a value equal to or smaller than the threshold value, the control unit 130 repeatedly detects the amplitude peak values of the driving mass driven in the inertial sensor by the sensing unit 140.

On the other hand, when the difference value Δt has a larger value than the threshold value, the control unit 130 performs an AGC operation for applying the gain to the driving mass of the inertial sensor 110 (S240).

In detail, as shown in FIG. 3B, the AGC operation may calculate, for example, a value of the overall gain for resonating the driving mass as the target value T, the number of steps applying the gain according to the difference value Δt, and a value of the gain applied to each step, or the like, for the driving mass having the difference value larger than the threshold value.

Herein, the reason of calculating the number of steps applying the gain in the AGC operation is to differentiate the steps of applying the gain by dividing the overall gain so as to prevent an excessive load from being generated in the inertial sensor 110 when the overall gain is applied at a time.

Further, the AGC operation may calculate only the value of the gain for resonating the driving mass as the target value T at a time without differentiating the step of applying the gain according to the difference value Δt.

When calculating the gain by performing the AGC operation, the control unit 130 generates the gain and applies the generated gain to the inertial sensor 110 through the driving unit 120 (S250).

When the control unit 130 applies the generated gain to the inertial sensor 110 through the driving unit 120, the gain is applied such that a new gain cannot be applied until the driving mass is stabilized.

Therefore, the control unit 130 determines whether the driving mass is stabilized so as to apply the new gain and detects the stabilization time to apply the new gain.

Therefore, the control unit 130 detects the variations of the amplitude peak values of the driving mass after the gain is applied as the parameter for determining whether the driving mass is stabilized (S260).

In more detail, for an oscillation state of the driving mass to which the gain shown in FIG. 4 is applied, the control unit 130 detects the variations $\Delta a_n$ of at least three amplitude peak values of the driving mass after the gain is applied through the sensing unit 140.

After the variations of the amplitude peak values of the driving mass are detected, the control unit 130 uses the variations $\Delta a_n$ to determine whether the driving mass is in the stabilized state (S270).

For example, the control unit 130 compares a sum of the variations $\Delta a_n$ detected in the oscillation of the driving mass shown in FIG. 4 with a threshold value TH to determine whether the variations $\Delta a_n$ are smaller than the threshold value TH, as represented by [Equation 1].

$$\Delta a_{n-m} + \ldots + \Delta a_{n-2} + \Delta a_{n-1} + \Delta a_n < TH \quad \text{[Equation 1]}$$

If it is determined that the sum of the variations $\Delta a_n$ is smaller than the threshold value TH, the variations $\Delta a_n$ are reduced, which means that the driving mass is in the stable process.

Therefore, the control unit 130 returns to the detecting of the amplitude peak values of the driving mass through the sensing unit 140 and repeatedly performs the above-mentioned processes so as to apply the new gain to the inertial sensor 110 after the variations $\Delta a_n$ are summed.

Here, the threshold value TH may be set according to the mass, size, and material of the driving mass. For example, for the case of setting the threshold value TH to a value of 3, when the gain is applied and then, a value obtained by summing at least three variations $\Delta a_n$ is detected as a value of $\Delta a_0 + \Delta a_1 + \Delta a_2 = 5$, the value of 5 obtained by summing the variations $\Delta a_n$ is larger than a value of 3 set as the threshold value TH and therefore, the control unit 130 determines that the driving mass is in the unstabilized state.

On the other hand, when the gain is applied and then, the value obtained by summing the variations $\Delta a_n$ is detected as a value of $\Delta a_0 + \Delta a_1 + \Delta a_2 = 2$, the value obtained by summing the variations $\Delta a_n$ is smaller than a value of 3 set as the threshold value TH and therefore, the control unit 130 determines that the driving mass is in the stabilized state.

Therefore, the control unit 130 may apply the new gain to the driving mass of the inertial sensor 110 at the time corresponding to $\Delta a_3$.

Alternatively, in addition to the method of determining whether the driving mass is in the stabilized state by comparing the sum of the variations $\Delta a_n$ with the threshold value TH, the control unit 130 detects at least one oscillation period in which any variation $\Delta a_n$ has a value of 0 as represented by [Equation 2] to determine the corresponding oscillation period as in the stabilized state.

$$\Delta a_n = 0 \quad \text{[Equation 2]}$$

For example, for the period in which the variations have the value of 0 such as "$\Delta a_9$" shown in FIG. 4, the control unit 130 may determine that the corresponding oscillation period reaches the stabilized state.

In this case, the control unit 130 detects whether the variations having the value of 0 continuously appear for implementing more accurate determination and thus, may determine that the corresponding oscillation period reaches the stabilized state. That is, when $\Delta a_9$ and $\Delta a_{10}$ are detected as continuously having the value of 0, the control unit 130 may determine whether the driving mass is in the stabilized state for the oscillation period including $\Delta a_9$ and $\Delta a_{10}$ and may apply the new gain to the driving mass of the inertial mass 110 at the corresponding time of the $\Delta a_{10}$.

When the driving mass is not in the stabilized state by performing the determining whether the driving mass is in the stabilized state (S270), the control unit 130 stops the AGC operation for applying the new gain to the driving mass of the inertial mass 110 (S280).

The stopping of the AGC operation by the control unit 130 means the stopping and waiting of the AGC operation until the driving mass is stabilized since the gain applied to the driving mass is not completed and is in an unstabilized state.

Therefore, the control unit 130 may also perform a process of detecting that the driving mass is in the stabilized state to apply the new gain to the driving mass of the inertial mass 110.

On the other hand, in the determining whether the driving mass is in the stabilized state (S270), when the driving mass is in the stabilized state, the control unit 130 returns to the detecting of the amplitude peak values of the driving mass through the sensing unit 140 (S210) so as to apply the new gain to the driving mass of the inertial sensor 110 to repeatedly perform the above-mentioned processes.

Therefore, the method for controlling an inertial sensor control module according to another preferred embodiment of the present invention can easily detect the stabilization state of the inertial sensor by using the algorithm for the variations $\Delta a_n$ of the amplitude peak values of the driving mass in the inertial sensor to which the gain is applied and correct and constantly maintain the driving mass resonance of the inertial sensor in the state of the target value.

The inertial sensor control module according to the preferred embodiments of the present invention can correct and maintain the mass resonance of the inertial sensor in the state of the target value of the inertial sensor by using the algorithm determining standby time and the applied time applying the gain to the inertial sensor.

Further, the method for controlling an inertial sensor control module according to the preferred embodiment of the present invention can easily detect the stabilization state of the inertial sensor by using the algorithm for the variations $\Delta a_n$ of the amplitude peak values of the inertial sensor of the driving mass in the inertial sensor to which the gain is applied and correct and constantly maintain the driving mass resonance of the inertial sensor in the state of the target value.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An inertial sensor control module, comprising:
    at least one inertial sensor including a driving mass;
    a driving unit driving the driving mass of the inertial sensor according to a control signal to the inertial sensor;
    a control unit connected to the driving unit and generating a control signal to transfer the generated control signal to the driving unit; and
    a sensing unit connected between the inertial sensor and the control unit and detecting information about whether the driving mass of the inertial sensor is in a stabilized state to transfer the detected information to the control unit,
    wherein the sensing unit detects an amplitude peak value of the driving mass and delivers the detected amplitude peak value to the control unit, and
    wherein the control unit compares a difference value $\Delta t$ between a target value T and the amplitude peak value P with a threshold value; when the difference value $\Delta t$ between the target value T and the amplitude peak value P has a larger value than the threshold value, the control unit operates an AGC, calculates a gain, produces a control signal reflecting the calculated gain and applies it to the inertial sensor through the driving unit; and when the driving mass is in a stabilized state, operates the AGC again, calculates a new gain and applies the new calculated gain to the inertial sensor through the driving unit.

2. The inertial sensor control module as set forth in claim 1, wherein the inertial sensor includes an acceleration sensor detecting accelerations in three axis directions or an angular velocity sensor detecting angular velocities in three axis directions.

3. The inertial sensor control module as set forth in claim 1, wherein the control unit includes an automatic gain control (AGC) and the control signal includes a signal for applying a gain for converting a resonance peak value of the driving mass into a set target value to the driving mass by using the AGC.

4. The inertial sensor control module as set forth in claim 1, wherein the sensing unit receives a sensing request signal of the control unit, and detects amplitude peak values of the driving mass to transfer the detected amplitude peak values to the control unit.

5. The inertial sensor control module as set forth in claim 1, wherein the control unit repeatedly detects an amplitude peak value of the driving mass driving in the inertial sensor through the sensing unit when a difference value $\Delta t$ between a target value T and the amplitude peak value P has a smaller value than or equal to a threshold value.

6. The inertial sensor control modules as set forth in claim 1, wherein the control unit calculates a gain corresponding to the difference value $\Delta t$ by operating an AGC and applies a gain corresponding to the difference value $\Delta t$ to the driving mass of the inertial sensor through the driving unit.

7. The inertial sensor control modules as set forth in claim 1, wherein the control unit operates an ACG, calculates a whole gain corresponding to the difference value $\Delta t$, the number of steps which will apply a gain according to the difference value $\Delta t$ and each gain which is applied per the steps, and the each gain per the steps to the driving mass of the inertial sensor through the driving unit.

8. The inertial sensor control modules as set forth in claim 1, wherein the control unit detects variations $\Delta a_n$ of amplitude peak values of the driving mass after a gain is applied and determines whether the driving mass is stabilized by comparing a sum of the detected variations $\Delta a_n$ with a threshold value TH.

9. The inertial sensor control modules as set forth in claim 1, wherein the control unit detects variations $\Delta a_n$ of amplitude peak values of the driving mass after a gain is applied and determines whether a vibration section of the driving mass is stabilized by detecting at least one vibration section which the detected variations $\Delta a_n$ is value of 0.

10. The inertial sensor control modules as set forth in claim 1, wherein the control unit sequentially detects variations $\Delta a_n$ of amplitude peak values of the driving mass after a gain is applied and determines whether a vibration section of the driving mass is stabilized by detecting the vibration section which the detected variations $\Delta a_n$ is sequentially value of 0.

11. A method for controlling an inertial sensor control module, comprising:
    detecting, by a control unit, an amplitude peak value P of a driving mass driven in an inertial sensor using a sensing unit;
    comparing, by the control unit, a difference value $\Delta t$ between a target value T and the amplitude peak value P with a threshold value to determine whether the difference value $\Delta t$ has a larger value than the threshold value;
    performing and processing, by the control unit, an AGC operation for applying a gain to the driving mass of the inertial sensor as the difference value Δt has a larger value than the threshold value;

determining whether the driving mass is stabilized; and when the driving mass is in a stabilized state, performing and processing, by the control unit, an AGC operation for applying a new gain to the driving mass of the inertial sensor.

12. The method as set forth in claim 11, after the determining whether the driving mass is in the stabilized state, further includes:

when the driving mass is in an unstabilized state, stopping and waiting, by the control unit, the AGC operation for applying a new gain to the driving mass of the inertial sensor.

13. The method as set forth in claim 11, wherein the performing and processing of the AGC operation further includes:

calculating, by the control unit, a gain corresponding to the difference value Δt; and applying the gain corresponding to the difference value Δt to the driving mass of the inertial sensor through a driving unit.

14. The method as set forth in claim 11, wherein the performing and processing of the AGC operation further includes:

calculating, by the control unit, the overall gain corresponding to the difference value Δt, and the number of steps applying the gain according to the difference value Δt, and each gain applied for each step; and applying each gain for each step to the driving mass of the inertial sensor through the driving unit.

15. The method as set forth in claim 11, wherein the determining whether the driving mass is stabilized includes:

detecting variations $\Delta a_n$ of amplitude peak values of the driving mass after the gain is applied; and comparing a sum of the detected variations $\Delta a_n$ with a threshold value TH to determine whether the sum of the detected variations $\Delta a_n$ is smaller than the threshold value TH.

16. The method as set forth in claim 11, wherein the determining whether the driving mass is stabilized includes:

detecting variations $\Delta a_n$ of amplitude peak values of the driving mass after the gain is applied; and determining a corresponding oscillation period as the stabilized state by detecting at least one oscillation period in which the detected variations $\Delta a_n$ has a value of 0.

17. The method as set forth in claim 15, wherein the threshold value TH is set according to a mass, a size, and a material of the driving mass.

\* \* \* \* \*